(12) United States Patent
Harrison

(10) Patent No.: US 7,194,636 B2
(45) Date of Patent: Mar. 20, 2007

(54) DATA AUTHENTICATION

(75) Inventor: Keith Alexander Harrison, Woodcroft Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 869 days.

(21) Appl. No.: 10/120,140

(22) Filed: Apr. 11, 2002

(65) Prior Publication Data

US 2002/0166064 A1 Nov. 7, 2002

(30) Foreign Application Priority Data

Apr. 11, 2001 (GB) .................................. 0109034.9

(51) Int. Cl.
  *G06F 11/30* (2006.01)
  *G06F 12/14* (2006.01)
  *G06F 21/00* (2006.01)
  *H04L 9/32* (2006.01)

(52) U.S. Cl. ...................... 713/193; 713/189; 380/201; 380/203; 380/28; 705/51; 705/57; 705/58; 705/59

(58) Field of Classification Search ................. 713/193
See application file for complete search history.

(56) References Cited

U.S. PATENT DOCUMENTS 5,706,047 A   1/1998   Lentz et al.
5,905,800 A * 5/1999   Moskowitz et al. .......... 380/28
5,917,908 A * 6/1999   Takenaka et al. ........... 713/190
6,028,936 A   2/2000   Hillis
6,170,060 B1  1/2001   Mott et al.
6,188,659 B1  2/2001   Mueller et al.

FOREIGN PATENT DOCUMENTS

EP   0 930 616     7/1999
EP   0984346 A1    3/2000
EP   1069567 A1    1/2001
WO   98/33176      7/1998

OTHER PUBLICATIONS

US 5,805,511, 09/1998, Oshima et al. (withdrawn)

* cited by examiner

*Primary Examiner*—Gilberto Barron
*Assistant Examiner*—Samson Lemma

(57) ABSTRACT

A storage medium carrying data content has an electronically readable modification-resistant identifier for distinguishing that medium from other storage media. The medium stores a digital signature associated with a data content portion carried by the storage medium. The identifier read from the storage medium generates the digital signature. The identifier and digital signature enable verification of storage of the data content on an authorised storage medium in an authorised manner.

21 Claims, 5 Drawing Sheets

DATA AUTHENTICATION

RELATED APPLICATIONS

The present application is based on, and claims priority to British Application Serial Number 0109034.9, filed Apr. 11, 2001, the disclosure of which is hereby incorporated by reference herein in its entirety.

BACKGROUND OF THE INVENTION

This invention relates primarily, but not exclusively, to a method of, and data storage medium adapted for, providing authentication of a data copy. It also relates, but not exclusively, to an electronic control device, for example a PC, adapted to sample a storage medium in order to authenticate the data thereupon and/or software to adapt the electronic control device to sample the storage medium.

Currently it is very simple to obtain a perfect copy of data recorded on digital media due to the proliferation of technologies such as, for example, CD rewriters. This has led to the massive growth of counterfeiting of computer software, DVD's and music CD's. Indeed in certain areas of the world there is virtually no genuine software, it is almost exclusively counterfeit.

Manufacturers of software and entertainment products currently have no convenient way of authenticating the data stored on a medium (e.g. a CD) in such a way that the authentication cannot be copied along with the data. This restricts the tracking of and quality control of products.

The ability of computers to copy data to floppy disks, the growth of MP3 players/recorders and the use of CD-rewriters to copy CD's, with no means of tracing the source data medium from which the data was copied and the machine used to copy the data, has resulted in the proliferation of untraceable copies of data.

U.S. Pat. No. 5,706,047 discloses an optical storage disc having a bar code in a mirror region of the disc. The code does not uniquely identify the disc.

U.S. Pat. No. 5,805,551 discloses a system for preventing illegal duplication from a CD or CD-ROM . On an optical mark section, there is recorded an ID number which is different at every disk. However, there is still a possibility of illegal printing. In order to improve prevention, a magnetic section is provided to record a magnetic ID number in the factory. A cipher to be recorded on the magnetic recording track is based on a mixture signal of the ID number, created by a unique ID number generator, and a disk physical arrangement (e.g. address, angular arrangement, tracking, pit depth, error rate) table, thus being different for every disk. First physical feature information and the different ID number are enciphered together. Accordingly, even if a disk whose password is known is obtained to replace the first cipher of this disk with the first cipher of another disk, operation is stopped because the physical information i.e. the original record is not the same. U.S. Pat. No. 5,805,551 does not disclose incorporating in the disk an electronically readable modification-resistant identifier for distinguishing the disk from other disks, which can be read from the disk in use.

WO 98/33176 A2 discloses a system for copy protection of recorded information. An information carrier comprises a medium mark representing a first bit pattern which cannot be copied on standard recording devices. The recorded information comprises a watermark representing a second bit pattern which has a predefined relationship to the first bit pattern. The medium mark indicates the status of the medium e.g. a code indicating a professional disk manufactured by pressing and is unique to a publisher or a title. Also, the recorded data is altered by the watermarking process.

SUMMARY OF THE INVENTION

According to a first aspect of the present invention there is provided a storage medium for carrying data content, comprising an electronically readable modification-resistant identifier for distinguishing said medium from other storage media, and having stored thereon a digital signature associated with a data content portion carried by the storage medium, the digital signature having been generated using said identifier, read from said storage medium, whereby the identifier and the digital signature can be used for verifying that the data content is stored on an authorised storage medium in an authorised manner.

The digital signature may be certified. The digital signature stored on the medium may be time-stamped. The timestamp may be provided by a trusted third party.

The identifier (i.d.) may be a media i.d. The identifier may be readable by a storage device, or a PC or a processor. The storage device, PC or processors may require modification from their 'as sold' state to be able to read the identifier. Such a modification may take the form of a plug-in card, firmware or software. The modification may be contained/concealed within the operating systems of the storage device, PC or processor. This limits the opportunities for pirates to access and decompile the modifications in order to circumvent them.

The identifier may be non-copyable, at least by consumer read/write devices. The identifier may be a serial number. The identifier may be written to a non-copyable section of the medium. The non-copyable section of the medium may be made of a different material to the remainder of the medium. The identifier may be integrally formed with the medium. The identifier may be written to the medium at the time of manufacture of the medium. The identifier may be stamped into a subsequently non-modifiable section of the medium. The non-modifiable section of the medium may be aluminium.

The storage device, PC or processor may not allow access to data stored on the medium if the identifier is not present or has been altered, on the medium. This allows only original, first generation, copies of software to be accessed.

There may be a second identifier associated with a storage device. The second identifier may used to generate the digital signature written to the medium, or may be written direct to the medium. The storage device may, in use, write data to the medium. The second identifier may be encrypted. The second identifier may be symmetrically or asymmetrically encrypted.

The second identifier may be a unique i.d, for example a serial number, of the storage device which, in use, wrote data to the medium. The second identifier may be written to a section of the medium which is modifiable only once, i.e. it is a 'write once-read many' section of the medium. The 'write once-read many' section of the medium may be made of a different material to the majority of the medium.

The second identifier may form part of a signature which identifies the storage device which wrote the data. The signature may also include a first identifier which identifies the medium from which the data originated The signature may be appended to the data, in use. There may be a timestamp associated with the second identifier. The timestamp may be issued by a trusted third party. This allows manufacturers to track and find when and where a copy of a medium was made and from which original medium the copy was taken.

The second identifier may be readable by a storage device, or a PC or a processor. The storage device, PC or processors may require modification from their 'as sold' state to be able to read the second identifier. Such a modification may take the form of a plug in card, firmware or software. The modification may be contained/concealed within the code of an operating systems of the storage device, PC or processor.

The storage device, PC or processor may read the second identifier prior to allowing access to data stored on the medium, in use. The storage device, PC or processor may not allow access to data stored on the medium if the second identifier is not present or has been altered, on the medium, or it may allow only restricted access to the data.

The storage medium may be any one of the following, non-exhaustive list; CD, CD-ROM, DVD), tape, magneto-optical disk, or magnetic disk RAM or any form of ROM.

According to a second aspect of the present invention there is provided a method for verifying that data content is stored on an authorised storage medium in an authorised manner, comprising providing a storage medium bearing an electronically readable modification-resistant identifier for distinguishing said medium from other storage media, generating a digital signature associated with a data content portion by reading the identifier from the storage medium and encrypting a digest of a combination of the identifier and the data content portion, and storing the resulting digital signature and the data content portion on the storage medium.

According to a third aspect of the present invention there is provided a method of authenticating data stored on a medium comprising the steps of:
i) searching a data storage medium for an identifier data element; and
ii) executing an action in relation to the data stored on the medium if the data element is not found or does not correspond to a media i.d. assigned to the medium.

The action may be denying access to the data stored on the medium. The action may be restricting access to certain portions of the data, for example, a virus scanning routine. The action may be creating a message for display to a user of the media. The action may be informing a third party of an attempt to load illicit data. The action may be to allow further copying of the data.

According to a fourth aspect of the present invention there is provided a method of data authentication comprising the second and third aspects of the present invention.

According to a fifth aspect of the present invention there is provided a data writer having a write head, the write head being adapted to write data and either, or both, of media identifiers or/and device identifiers to a storage medium according to the first aspect of the present invention.

According to a sixth aspect of the present invention there is provided a data reader having a read head, the read head being adapted to read data and either, or both, of media identifiers or/and device identifiers from a storage medium according to the first aspect of the present invention.

According to a seventh aspect of the present invention there is provided a data storage device according to the fifth and sixth aspects of the present invention.

According to an eighth aspect of the present invention there is provided a method for detecting the use of illicitly copied data storage media comprising the steps of:
i) assigning a unique identifier to a medium;
ii) recording the identifier upon a non-copyable portion of the medium;
iii) appending a data segment corresponding to the identifier to data stored upon the medium;
iv) inserting the medium into a reader and processor;
v) searching the medium for the data segment and unique identifier; and
vi a) notifying a third party if either or both of the data segment or the unique identifier are not found on the medium; or
vi b) notifying a third party if upon comparison, the data segment does not correspond to the identifier.

The method may include the step of restricting access to the data stored on the medium if either of steps vi a) or vi b) are enacted, for example by preventing virus checking. The method may further include preventing access to the data stored on the medium.

The method may further include allowing copying of the data if either of steps vi a) or vi b) are enacted.

The reader and processor may be networked. The third party may be a network manager. The third party may be an author of the data.

Steps vi a) and vi b) may involve e-mailing the notification to the third party. The e-mail may include an identifier of the reader and/or processor, for example an IP number/address.

This has the advantage of allowing network managers to know when, and possibly on which machines, illicit copies of data are being used on the networks for which they have responsibility. It may also allow authors to know if their data is being illicitly used.

According to a ninth aspect of the present invention there is provided a method of logging the number of users of a piece of software comprising:
i) providing a data storage medium according to the first aspect of the present invention;
ii) mounting the storage medium upon a reader;
iii) recording an indication that the data has been accessed; and
iv) accusing data stored upon the storage medium.

The method may further include incrementing a counter each time the data has been accessed. The method may include networking the reader. The method may include providing the reader as a network server. The method may further include charging a user accessing the data.

his allows the use of data and/or software and/or music to be monitored and possibly charged for. In a factory environment it is possible for employees to use machinery unauthorised during scheduled downtime to produce counterfeit goods. This method allows the unauthorised use of software to be detected.

BRIEF DESCRIPTION OF THE DRAWINGS

The invention will be described by way of example, with reference to the accompanying drawings in which.

DESCRIPTION OF THE PREFERRED EMBODIMENT

Figure 1:
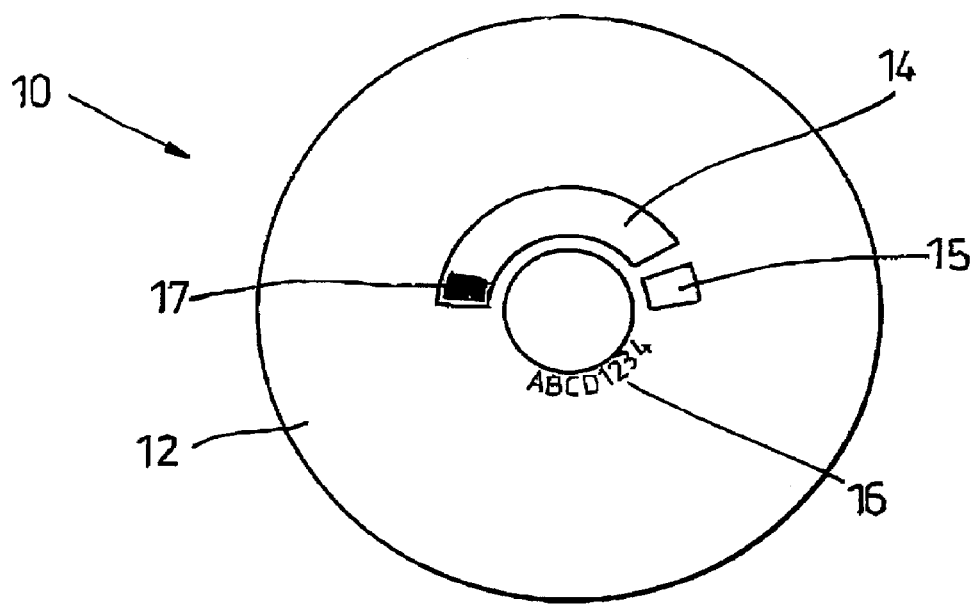
FIG. 1 is a schematic representation of a storage medium according to one aspect of the present invention.
Figure 2:
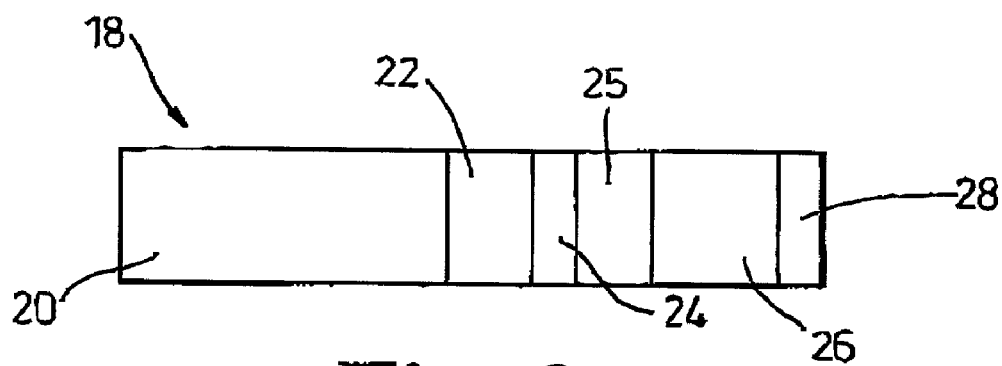
FIG. 2 is a schematic representation of a data block to be stored on the medium of FIG. 1.
Figure 3:
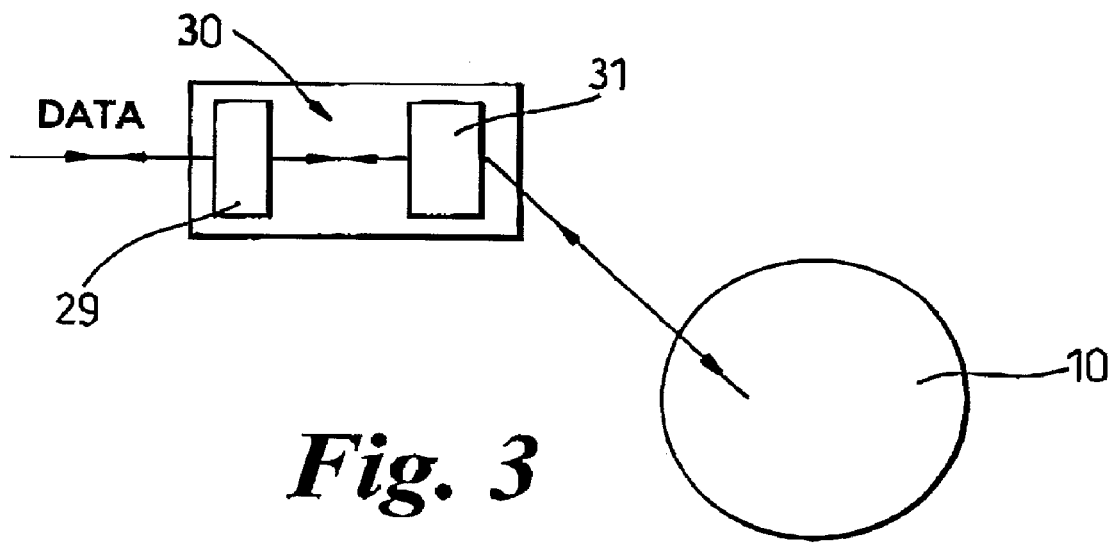
FIG. 3 is a schematic representation of a storage system incorporating the present invention.
Figure 4:
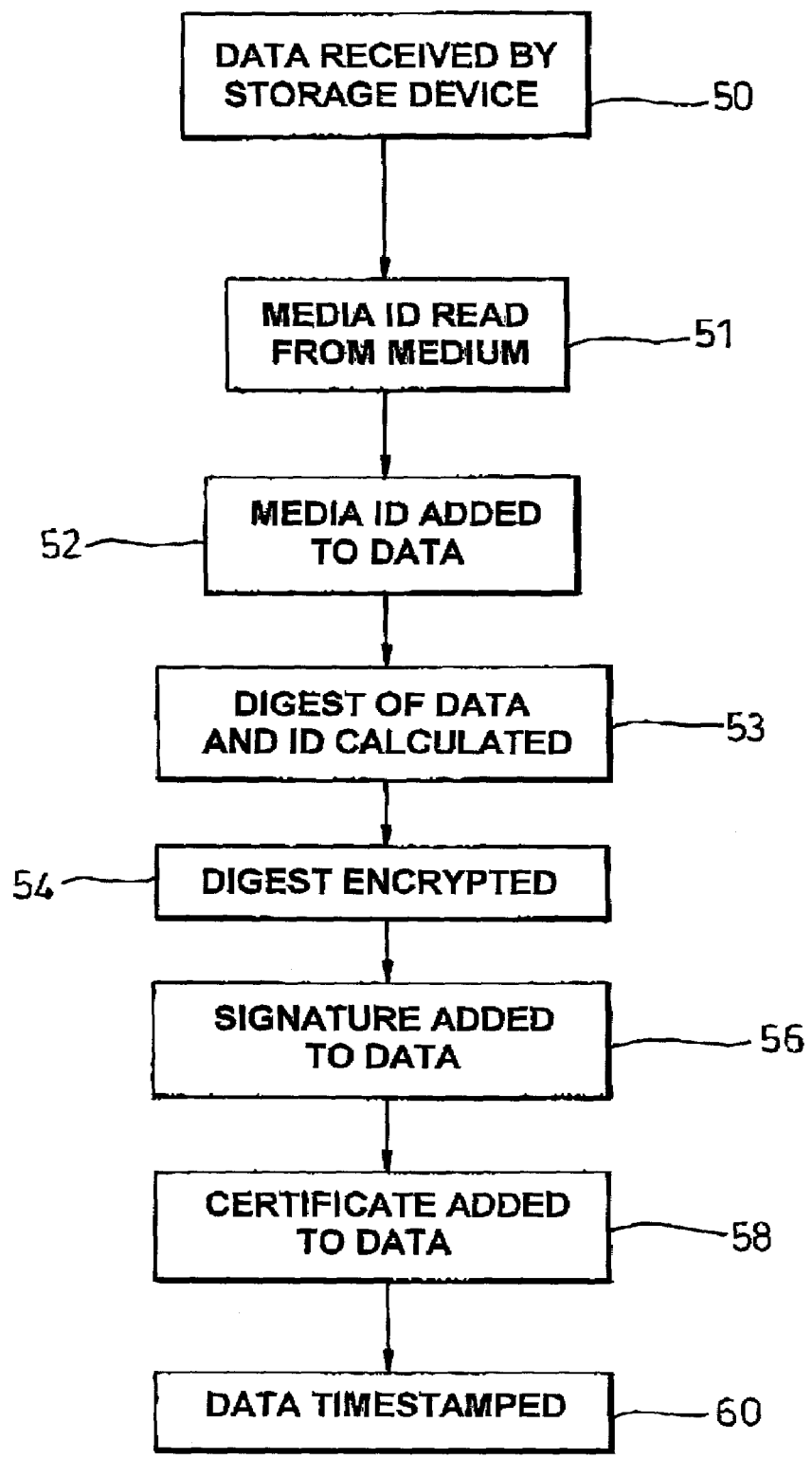
FIG. 4 is a flow chart showing a method of recording data according to the present invention.
Figure 5:
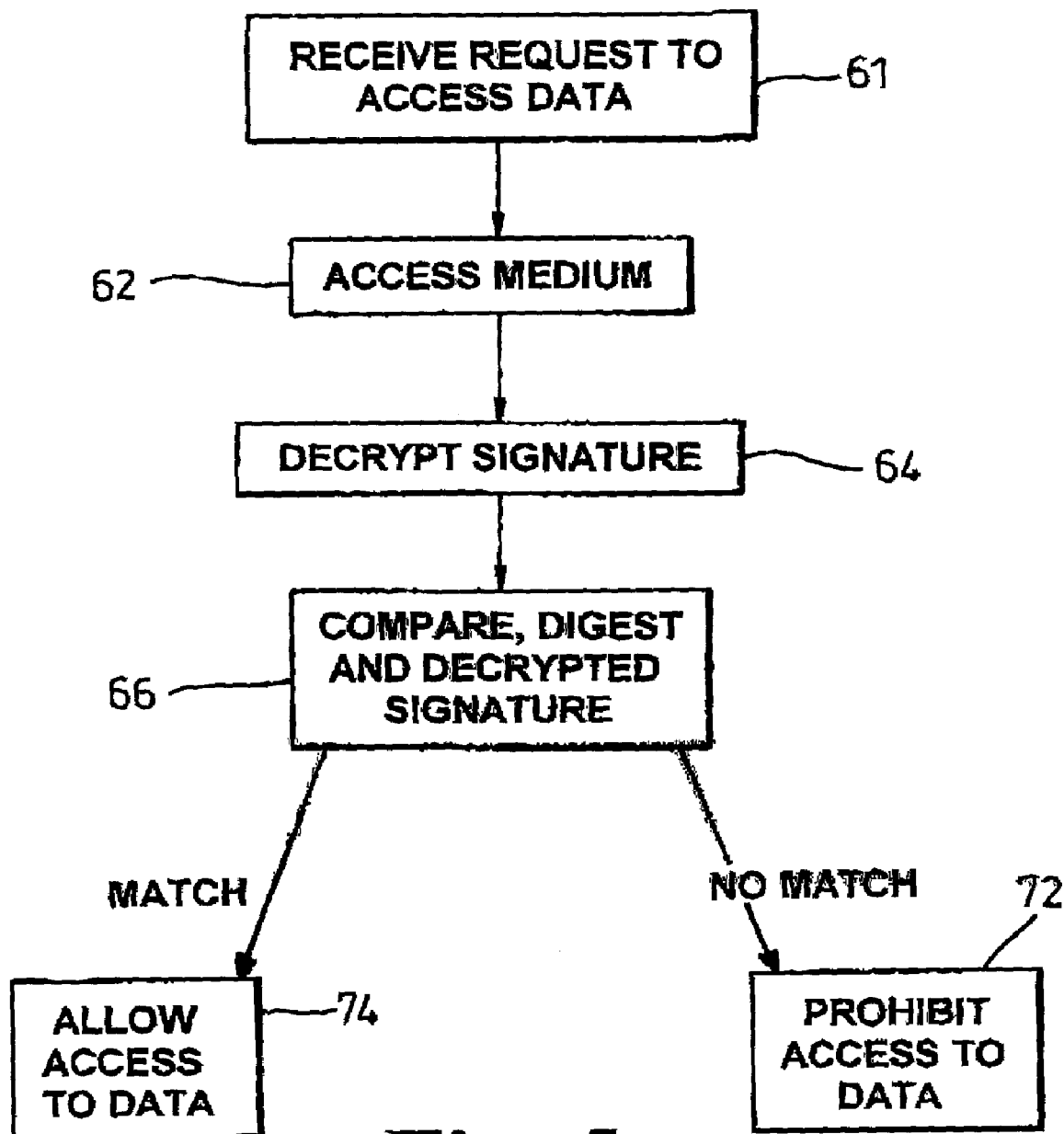
FIG. 5 is a flow chart showing a method of reading data according to the present invention.
Figure 6:
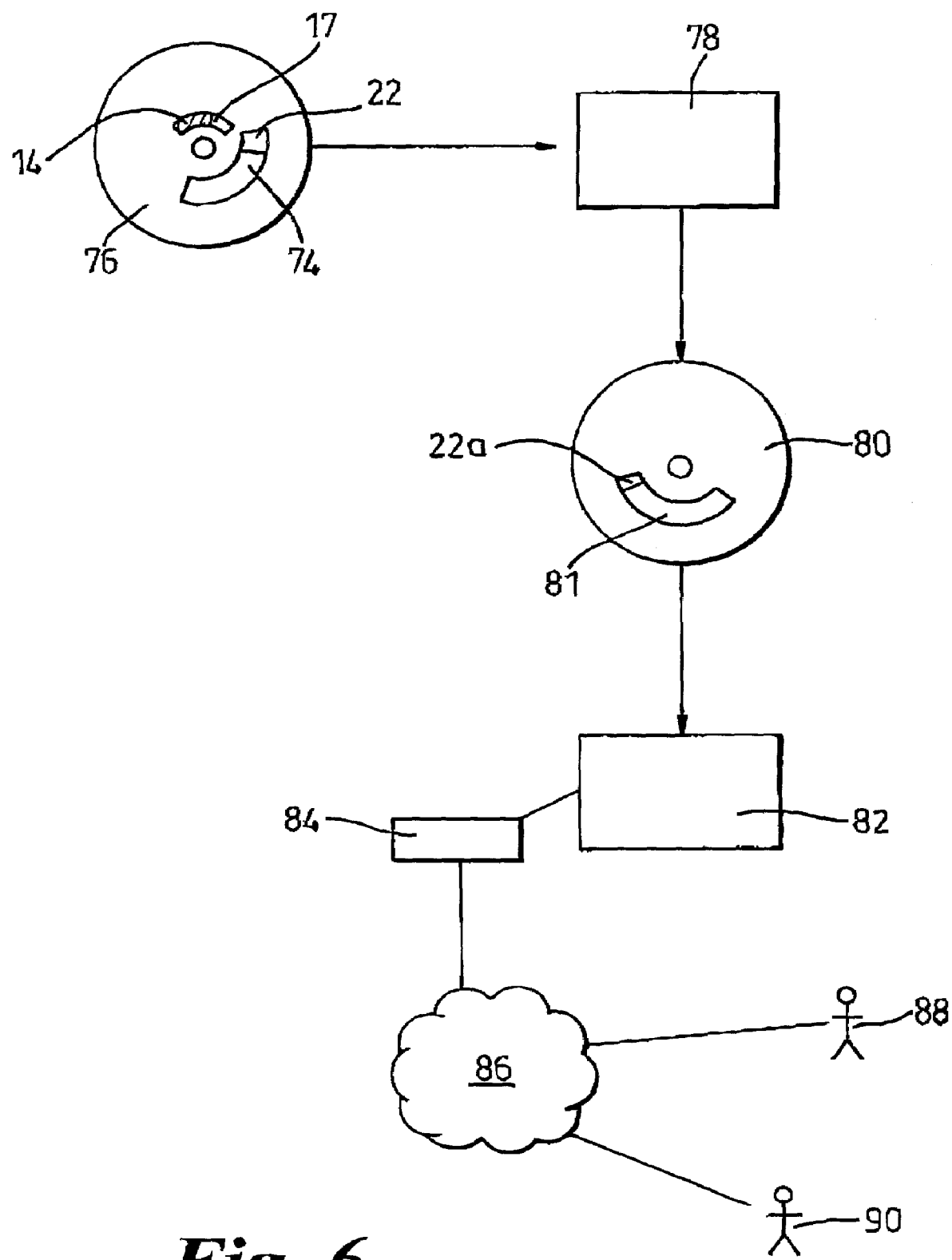
FIG. 6 is a schematic representation of a copying arrangement of a medium according to the present invention.

A data storage medium 10, has a major portion 12, a minor portion 14 and a write once-read many portion 15. The major portion 12 is typically read-write; thereby allowing reuse of the data storage medium 10.

The minor portion 14 is typically read-only thereby preventing the alteration of any data which is recorded thereupon. A media identifier (i.d.) 17 distinguishes the medium 10, preferably uniquely, from other storage media, and is encoded and stored as an identification block 16 within the minor portion 14. The identifier 17 is electronically readable and modification-resistant, preferably substantially non-modifiable, by commonly available consumer devices adapted for use with such media.

A data block 18 intended to be written to the medium 10 comprises body data 20, optionally a data segment 22 which corresponds to the unique media i.d. 17 and optionally a digest 24. The digest 24 is a digest of the body data 20 and the data segment 22 and may be encrypted to form a signature 25.

Digital signatures reduce the opportunities for data tampering and falsification. In the embodiment, the digital signature 25 is generated by passing the data 20 and the identifier data 22 through a hashing algorithm to obtain the digest 24 of the message. The digest 24 is then encrypted using an asymmetric encryption private key to provide a signature 25. The signature 25 is appended to the data 20 or otherwise stored on the medium 10 for transmission with the data 20.

A third party who has the public key which is complementary to the private key used in the encryption process can decrypt the signature 25 to obtain the digest. The third party can also rehash a combination of the received data 20 and the identifier 17 read from the medium 10 and calculate the digest of this. The digest from the decrypted signature 25 and the digest from the rehash are compared, if they do not match then the data has been tampered with.

The data block 18 optionally includes a certificate 26 issued to the author of the data 20 and an optional timestamp 28. The certificate 26 can include the public key necessary to decrypt the signature 25. It will be understood that the certificate could conveniently be obtained from other channels when required, and thus need not be stored on the disk.

Certificates are electronic documents which attest to the identity of the person from whom the document came. They are issued by trusted identity certification authorities and have an expiry date to reduce the time available for them to be hacked or cracked.

The timestamp 28 serves to verify that the data block 18 was signed prior to the expiry of the certificate 26 and can be provided by a trusted third party.

Writing Data to the Data Carrier

The body data 20 is received from a data source by an interface 29 of a storage device 30, (step 50). The unique media i.d. 17 is read from the medium (step 51) and added to or associated with the body data 18 (step 52) as an i.d. data segment 22, typically either a header or a footer. This "body data and media ID" information is temporarily held in the device 30.

The digest 24 of the combined data 20 and i.d. data segment 22 is calculated (step 53) by the device 30, for example by using a hash function. The digest 24 is encrypted (step 54) using a private key owned by the author of the data to form the signature 25 (step 56). The digest 24 and/or i.d. data segment 22 are optionally appended to the body data 20. In the preferred embodiment, the digest 24 and i.d. data segment 22 are not included in the data block 18.

In some embodiments a certificate containing a public key corresponding to the private key is appended (step 58) to the data block 18. This identifies the author of the data and has an expiry date. The temporal limit on the validity of a certificate 26 resists the opportunities for the cracking/hacking of the private key associated with the certificate. A trusted third party may timestamp the data (step 60) in order to verify that the data was recorded prior to the expiry of the certificate 26.

Reading Data from the Data Carrier

Upon receiving a request to access the body data 20 (step 61) a processor 31 associated with a storage device 30 accesses the medium 10 (step 62) and decrypts (step 64) the signature 25 to obtain a digest. This digest is compared to a digest calculated using the public key (step 66) from a combination including the body data 20 and the unique i.d. 17 read from the medium 10.

If the decrypted signature and the rehash of the body data and unique i.d. do not match, or the unique i.d. is not found, the processor 31 can refuse to access (step 72) the data.

Either or both of the processor 31 or storage device 30 may require adaptation in order to allow it to access the media i.d. 17 stored in the minor portion 14 of the medium 10 and carry out the matching process described above. This can be achieved in a number of ways for example, software alterations to the operating system, firmware or hardware additions to the systems of either or both of the processor 31 or storage device 30.

It is envisaged that each data storage device 30 could have its own unique i.d. which is written to the write once-read many portion 15 of the medium 10, for example, at the same time as the writing of the data block 18 to the medium 10. The storage device 30 i.d. can be incorporated into the signature 25. Thus, it is possible to track the reproduction of the data with reference to the storage device 30 upon which the copy was made.

In use, a first CD 76 bearing a unique media i.d. 17 is inserted in a CD rewriter 78 and a copy of data stored on the first CD 76 is made to a second CD 80. The copy of the data includes the digital signature 25 generated using the unique media i.d. 17. However, as the hard-written unique media i.d. 17 is recorded upon a non-copyable portion 14 of the first CD 76 it is not possible for a commonly available consumer rewriter device to transfer this to the second CD 80.

When the second CD 80 is inserted in a commonly available consumer reader 82, for example on a PC, DVD player, music system or network server, which is in accordance with an aspect of the present invention, the reader 82 may be able to decrypt the data segment 22 containing the copy of the unique media i.d.17, if optionally included, but will not be able to locate the hard-written copy of unique media i.d. 17 on the second CD 80.

Upon failing to read the hard-written media i.d. 17 the reader 82 can deny access to the data contained upon the second CD 80. Alternatively the reader 82 may restrict access to certain portions of the data, for example a virus scanning routine as if a copy has been made the author of the data makes no guarantees and accepts no liability for any viruses present upon the media 10. As a second alternative the reader 82, in conjunction with a processor 84 may produce a message, either audio or visual, which informs a potential user of the illicit copy that for example, they are using an illegal copy and should desist. As a third alternative, if the reader 82 and a processor 84 are connected to a network 86, for example the Internet, it is possible to send a message over the network 86 informing either, for example, a network manager 88 or the author 90 of the software that an illicit counterfeit copy is attempted to be loaded on the network 86. This may reduce office liability for counterfeit software use, as it would allow the network manager to act swiftly to eradicate such abuses.

It will be appreciated that references to date in the preceding paragraphs relate to any form of data e.g. text, video, audio (for example sound, music, recordings), computer programs, databases or the machine readable codes.

It will further be appreciated that although reference has been made to first and second CD's either of the first and second media could be any one of tape, magnetic-optical disks, DVD, magnetic disk, or ROM.

Figure 7:
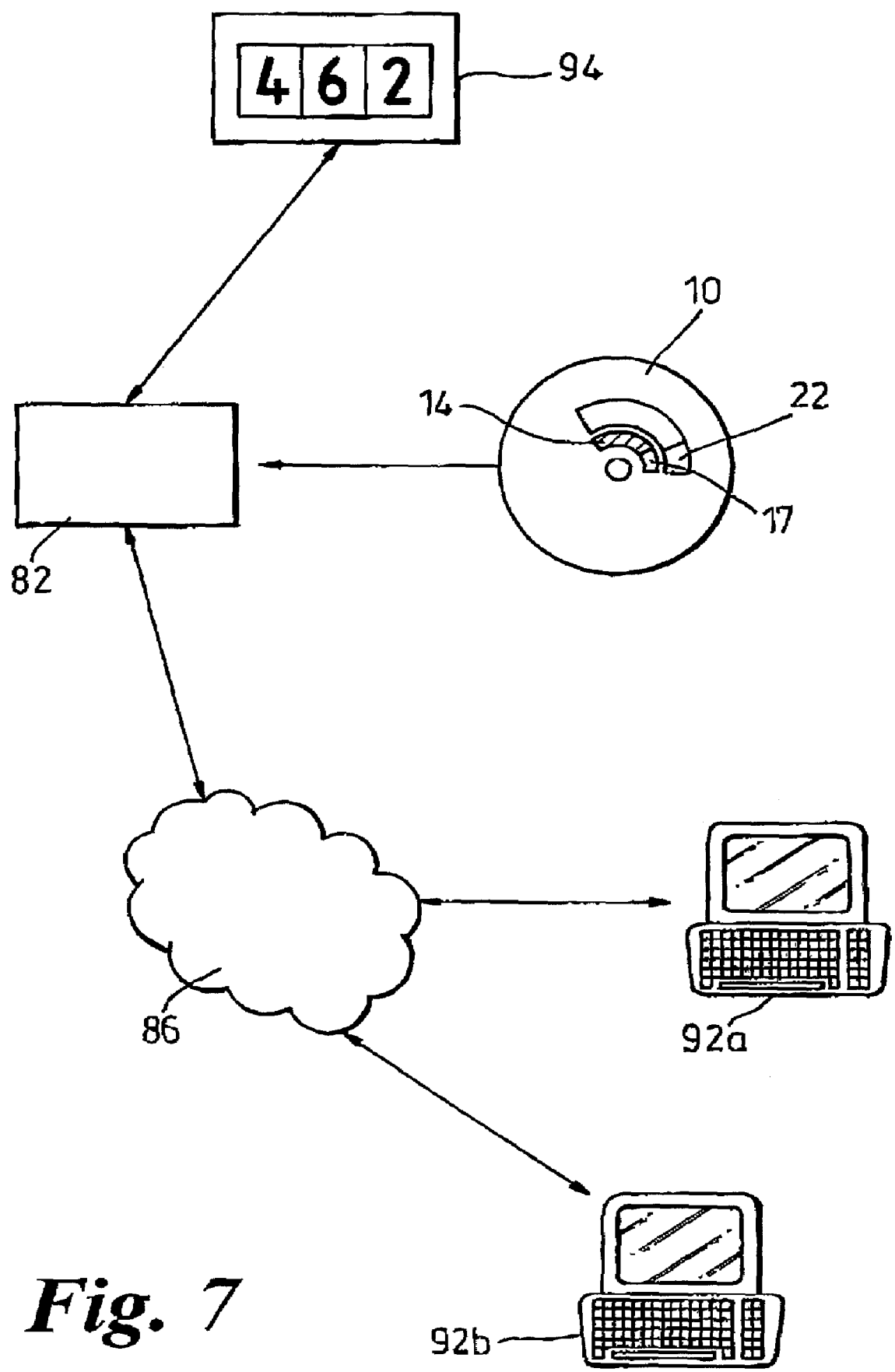
FIG. 7 is a schematic representation of a counter arrangement according to one aspect of the present invention.

The reader 82 can act as a network server and data on a medium 10 mounted thereupon can be accessed via the network 86 by a plurality of devices 92a, 92b, shown in FIG. 7, as PC's. The devices could be any one of a PC, storage device, DVD, music player or server. Each time the medium 10 is accessed an identifier of the devices, for example 92a, accessing the medium 10 is recorded and a counter 94 is incremented. The counter 94 can be internal of the reader 82 or can be a separate external device such as a PC or server. A counter can be arranged for each device 92a, 92b or a single counter can count the total number of times the medium is accessed.

This arrangement allows users accessing the data on the medium 10 to be charged for the number of times they access the data. Each user may have an identifier such as a PIN which increments their individual counter whichever device 92a, 92b they access the data from.

The invention claimed is:

1. A first storage medium for carrying data content, comprising an electronically readable modification-resistant first identifier that distinguishes said medium from other storage media, and having stored thereon a digital signature associated with a data content portion carried by the storage medium, the digital signature including a combination of said first identifier, as read from said storage medium, and a second identifier that identifies a device that originated the digital signature prior to the digital signature being applied to the storage medium, whereby the first identifier and the digital signature can be used for verifying that the data content is stored on an authorised storage medium in an authorised manner.

2. The first storage medium according to claim 1, wherein said digital signature is generated by encrypting a digest of a combination including the first and second identifier and at least some of the data content portions.

3. The first storage medium according to claim 1, wherein the data content is recorded onto the storage medium without modification of the form and/or content of the data content.

4. The first storage medium according to claim 1, having stored thereon a plurality of said data content portions and a plurality of corresponding respective said digital signatures.

5. The first storage medium according to claim 1, wherein the first identifier is copy-resistant by commonly available consumer rewriters.

6. The first storage medium according to claim 1, wherein the digital signature is stored on the storage medium accompanied by a time-stamp.

7. The first storage medium according to claim 1, wherein said digital signature is encryption of a digest of a combination of the first identifier, at least some of the data content portion, and the second identifier.

8. The first storage medium according to claim 1, wherein the first and second identifiers are unencrypted on a write-once read-many portion of the storage medium.

9. A method of verifying that data content is stored on an authorised first storage medium in an authorised manner, the first storage medium bearing an electronically readable modification resistant first identifier that distinguishes said medium from other storage media, comprising generating a digital signature associated with a data content portion by reading the first identifier from the storage medium and encrypting a digest of a combination of the first identifier, the data content portion, and a second identifier that identifies a device that originated the digital signature prior to the digital signal being applied to the storage medium, storing the resulting digital signature and the data content portion on the storage medium, and using the combined identifier and the digital signature to detect unauthorised modification of data on the first storage medium.

10. A method of authenticating data stored on the first storage medium according to claim 2, comprising:
  i) searching a data storage medium for the digital signature;
  ii) responding to the digital signature to obtain a digest including a combination of the data content and the first and second identifiers;
  iii) reading the Identifier from the storage medium and generating a digest using the data content and the identifier;
  iv) comparing the digests; and
  v) executing an action in relation to the data stored on the medium if the digital signature is not found or if the digests do not correspond to one another.

11. A method according to claim 10, wherein the action includes denying or restricting access to the data content stored on the medium, and/or creating a message for display to a user of the medium.

12. A data writer and/or reader adapted to carry out the method of claim 10.

13. A data storage device comprising a data writer and/or reader according to claim 12.

14. A first storage medium carrying data content, comprising an electronically readable modification-resistant first identifier that distinguishes said medium from other storage media, and having stored thereon a digital signature associated with a data content portion carried by the storage medium, the digital signature including encryption of the first identifier and a second identifier that identifies a device that originated the digital signature prior to the digital signature being applied to the storage medium and at least some of the data content portion, whereby the combined identifier and the digital signature can be used for verifying that the data content is stored on an authorised storage medium in an authorised manner, and wherein the data content is recorded onto the storage medium without modification of the form and/or content of the data content.

15. A storage medium carrying data content, comprising an electronically readable modification-resistant identifier for distinguishing said medium from other storage media, and having stored thereon a digital signature associated with a data content portion carried by the storage medium, the digital signature having been generated using said identifier, read from said storage medium, whereby the identifier and the digital signature can be used for verifying that the data content is stored on an authorised storage medium in an authorised manner, wherein said digital signature is generated by encrypting a digest of a combination including the identifier and at least some of the data content portion, and wherein the data content is recorded onto the storage medium without modification of the form and/or content of the data content, and wherein said digital signature is generated by encrypting (a) a digest of a combination of the identifier, (b) at least some of the data content portion, and a device identifier for identifying a device which effects generation and/or storage of the digital signature prior to the digital signature being applied to the storage medium.

16. A method of detecting the use of a data storage medium carrying illicitly copied data, wherein (a) the medium on which the data are stored has, a unique first identifier assigned to it, (b) a digital signature including the first identifier and a second identifier that identifies a device and/or a second storage medium that originated the digital signature prior to the digital signal being applied to the storage medium, the identifier being recorded on a non-copyable portion of the medium, and (c) a data segment corresponding to the combined identifier is appended to data stored on the medium; comprising the steps of: searching the medium for the data segment and the digital signature; and notifying a third party if upon comparison, the identifier on the non-copyable portion, when combined with a predetermined combination of bits, does not correspond with the digital signature on the data segment.

17. A method of verifying that data content has been stored in accordance with claim 9 on an authorized storage medium in an authorized manner, comprising using the first and second identifiers and the digital signature to detect unauthorized modification of data on the first storage medium.

18. A method of: (a) preventing reading of first body data of interest to a user by a commonly available consumer reader of commonly available consumer storage media, the first body data having been illicitly written on a major portion of a first commonly available consumer storage medium as a result of the first body data being illicitly copied from a second commonly available consumer storage medium by a commonly available consumer rewriter from the second storage medium to the first storage medium, and (b) authorizing reading of second body data of interest to a user by a commonly available consumer reader of commonly available consumer storage media, the second body data having been properly written on a third commonly available consumer storage medium, each of said storage media being of the same general type and including a read only portion, the method comprising:

writing first data uniquely associated with the third storage medium on the major portion of the third storage medium, the first data being derived by combining identifications of the third storage medium and a device that applied the second body data to the third storage medium;

writing a unique identifier of the third, storage medium on a non-copyable portion of the third storage medium;

writing second data uniquely associated with the second storage medium on the major portion of the second storage medium, the second data being derived by combining identifications of the second storage medium and a device that applied the first body data to the second storage medium;

writing a unique identifier of the second storage medium on a non-copyable portion of the second storage medium;

arranging the commonly available consumer rewriter so the commonly available consumer rewriter can rewrite body data onto the major portion of any of the commonly available storage media, but can not rewrite information on non-copyable portions of the commonly available consumer storage media onto any of the commonly available storage media; and arranging the commonly available consumer reader so the commonly available consumer reader (a) can read the body data on the main portion of the third storage medium as a result of the commonly available consumer reader being able to match signals resulting from the first data in the major portion of the third medium and the unique identifier on the non-copyable portion of the third medium, and (b) can not read the body data on the first storage medium because of the inability to derive signals that match in response to data in the major portion of the first medium with the identifier in the non-copyable portion of the first medium.

19. The method of claim 18 wherein the commonly available consumer storage media are any one of CDs, tapes, magnetic-optical disks, DVDs, magnetic disks and ROMs.

20. An arrangement for: (a) preventing reading of first body data of interest to a user by a commonly available consumer reader of commonly available consumer storage media, the first body data having been illicitly written on a major portion of a first commonly available consumer storage medium as a result of the first body data being illicitly copied from a second commonly available consumer storage medium to the first storage medium by a commonly available consumer rewriter, and (b) authorizing reading of second body data of interest to a user by a commonly available consumer reader of commonly available consumer storage media, the second body data having been properly written on a third commonly available consumer storage medium, each of said storage media being of the same general type and including a read only portion, the arrangement comprising:

first data uniquely associated with the second storage medium on the major portion of the second storage medium, the first data resulting from a combination of identifications for the second storage medium and a device that applied the first body data to the second storage medium;

second data uniquely associated with the third storage medium on the major portion of the third storage medium, the second data resulting from a combination of identifications for the third storage medium and a device that applied the second body data to the third storage medium;

the first storage medium not including on the major portion thereof the first data;

the commonly available consumer rewriter being arranged so the commonly available consumer rewriter can not rewrite, onto any of the storage media, information on the non-copyable portion of any of the storage media;

the commonly available consumer reader being arranged so it can (a) read the body data of a commonly available consumer storage medium that the commonly available consumer reader is reading as a result of the commonly available consumer storage medium that the commonly available consumer reader is reading including on the major portions thereof data uniquely associated with that storage medium that can be matched with the identifier on that storage medium, and (b) can not read the body data of a commonly available consumer storage medium that the commonly available consumer reader is reading in response to the commonly available consumer storage medium that the commonly available consumer reader is reading as a result of the commonly available consumer storage medium that the commonly available consumer reader is reading including on the major portions thereof data uniquely associated with that storage medium that can not be matched with the identifier on that storage medium; and whereby the commonly available consumer reader can read the second body data on the third storage medium to a user and can not read the first body data on the first storage medium to a user.

21. The arrangement of claim 20 wherein the commonly available consumer storage media are any of CDs, tapes, magnetic-optical disks, DVDs, magnetic disks and ROMs.

* * * * *